UNITED STATES PATENT OFFICE.

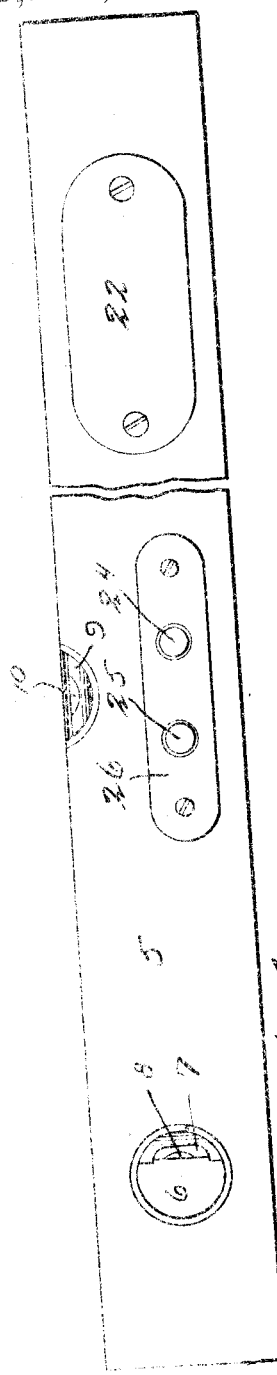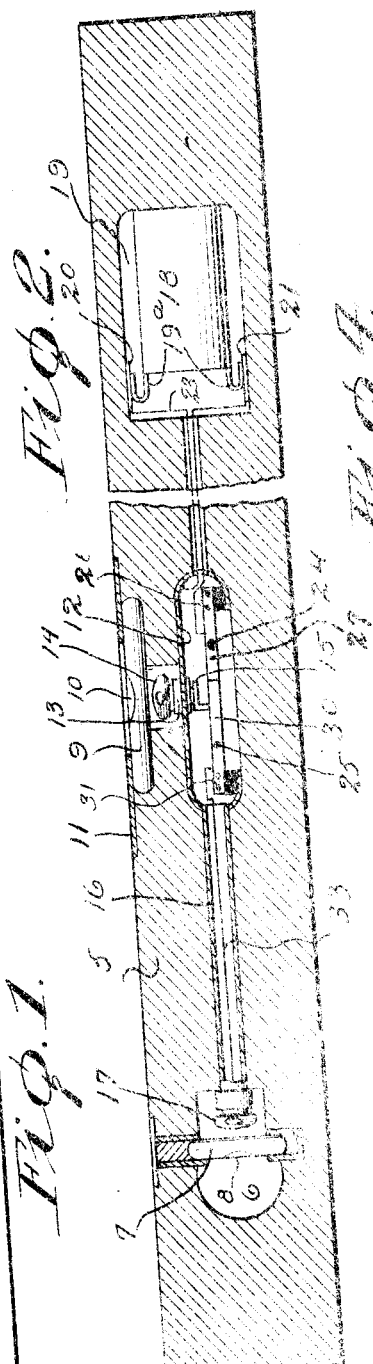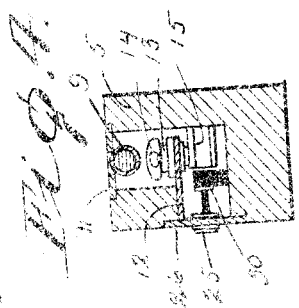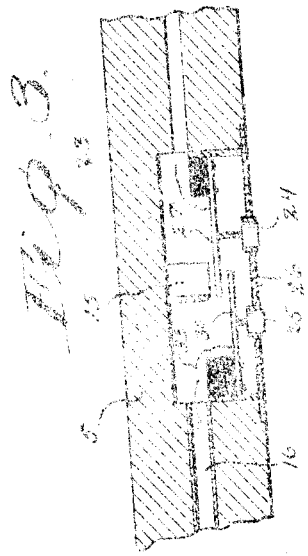

RAPHAEL BENNETT AND ALVAH E. BLANCHARD, OF PRESQUE ISLE, MAINE.

ILLUMINATED LEVEL.

1,193,976.    Specification of Letters Patent.    Patented Aug. 8, 1916.

Application filed September 22, 1914. Serial No. 863,037.

*To all whom it may concern:*

Be it known that we, RAPHAEL BENNETT and ALVAH E. BLANCHARD, citizens of the United States, residing at Presque Isle, in the county of Aroostook, State of Maine, have invented certain new and useful Improvements in Illuminated Levels; and we do hereby declare the following to be a full, clear, and exact description of the invention, such as will enable others skilled in the art to which it appertains to make and use the same.

This invention relates to indicating devices, particularly to levels for the use of carpenters and others, and has for its object the provision of a level provided with electric lamps adapted when energized to throw light through the spirit level for making the bubble clearly visible when the level is used in dark places.

An important object is the provision of a level provided with electric lights and further provided with a control switch whereby the light may be shown through the level and the plumb gage.

A further object is the provision of a device of this character which will be simple and inexpensive in manufacture, efficient and durable in use, and a general improvement of the art.

With these and other objects and advantages in view, the invention consists in the novel construction and arrangement of parts as will be hereinafter more fully described and claimed, and illustrated in the accompanying drawing, in which—

Figure 1 is a side elevation of our novel level. Fig. 2 is a vertical sectional view therethrough. Fig. 3 is a horizontal sectional view taken centrally through the intermediate portion of the level, and Fig. 4 is a vertical cross sectional view taken through the central portion of the level.

Referring more particularly to the drawing the numeral 5 designates the casing of our device which may be of wood and of the ordinary shape and size. Adjacent one end the casing 5 is cutaway as shown at 6 and has a plumb gage 7 disposed so as to have its bubble 8 visible through the opening 6. Upon the upper face of the central portion, the casing 5 is provided with the usual spirit level 9 having the bubble 10 and protected by the usual plate 11. These parts are all well known and of the ordinary construction.

In order that light may be thrown through the plumb gage 7 and level 9, we provide a metallic member 12 disposed within a recess in the central portion of the casing and provided with a socket 13 receiving the threaded end of an incandescent lamp 14 which is positioned below the level 9. A bracket 15 is mounted below the member 12 and contacts with the button upon the end of the lamp 14. A tubular member 16 is disposed within the casing 5 and is connected with the member 12 and has screw threaded engagement at its outer end with an incandescent lamp 17 disposed adjacent the plumb gage 7.

In order that either of the lamps 14 or 17 may be energized, we provide a battery 18 disposed within a recess 19 in the other end of the casing 5 having its terminals 19ª contacting with fixed contacts 20 and 21 secured within the recess 19. The recess is closed by a plate 22. The stationary contact 20 is connected by a wire 23 with the member 12.

In order that either lamp may be energized we provide push buttons 24 and 25 passing through a plate 26 secured over the central recess in the casing. A spring arm 27 is secured as at 28 upon and insulated from the member 12 and is normally held retracted toward the plate 26 by its own resilience. The push button 24 engages the arm 27 and the arm 27 is connected with the other stationary contact 21. A second arm 30 is secured at 31 upon and insulated from the member 12 and is normally held retracted toward the plate 26 by its own resilience, the arm 30 being engaged by the push button 25. The arm 30 has a wire 33 connected therewith which is connected with the contact button upon the end of the lamp 17.

If it is desired to show the light below the level it is merely necessary to press upon the push button 24 whereupon the arm 27 will contact with the bracket 15 thus completing a circuit from the contact 20 through the member 12, lamp 14 bracket 15, arm 27 and the contact 21. As long as the push button 24 is depressed the lamp 14 will be energized. In order to show a light back of the plumb gage 7 it is merely necessary to press upon the push button 25, whereupon the arm 30 will contact with the arm 27 and cause current to flow through the contact 20, member 12, tubular member 16, lamp 17, wire 33, arm 30, arm 27, and the wire connecting the arm 27 with the contact 21.

From the foregoing description and a study of the drawing it will thus be apparent that we have provided a novel and simple level and plumb gage in which the indicating bubble may be visible when the device is used in dark places, by merely pressing upon a push button. The use of this device makes the operator's work more accurate as there is no guess work in regard to the position of the bubble. The device also obviates the necessity for striking matches to see the position of the bubble, striking of matches being extremely dangerous where there are shavings as in carpenter work. It will also be obvious that in case a tool is dropped our device may be used as a search light for recovering the dropped article.

It will be readily understood that we reserve the right to make various changes in the form, construction and arrangement of parts without departing from the spirit of the invention or limiting the scope of the subjoined claim.

Having thus described our invention, we claim:

The combination with a casing having a spirit level and plumb gage therein, of a metallic member within said casing extended adjacent said level and gage, incandescent lamps engaged with and carried by said member and disposed adjacent said level and gage, a member engageable by one contact of one of the lamps, an insulated spring finger mounted in the casing, means for moving it to engage said last member, a second spring finger engageable with the first finger, means for moving it to such engagement and a source of electrical energy, a connection between said source of energy and the metallic member, a connection between said source of energy and the first named finger and a connection between the second named finger and the other of said lamps.

In testimony whereof, we affix our signatures in the presence of two witnesses.

RAPHAEL BENNETT.
ALVAH E. BLANCHARD.

Witnesses:
B. MARKS,
C. W. DAVIS.